E. DUNNING.
NUT LOCK.
APPLICATION FILED AUG. 5, 1909.
992,486.
Patented May 16, 1911.
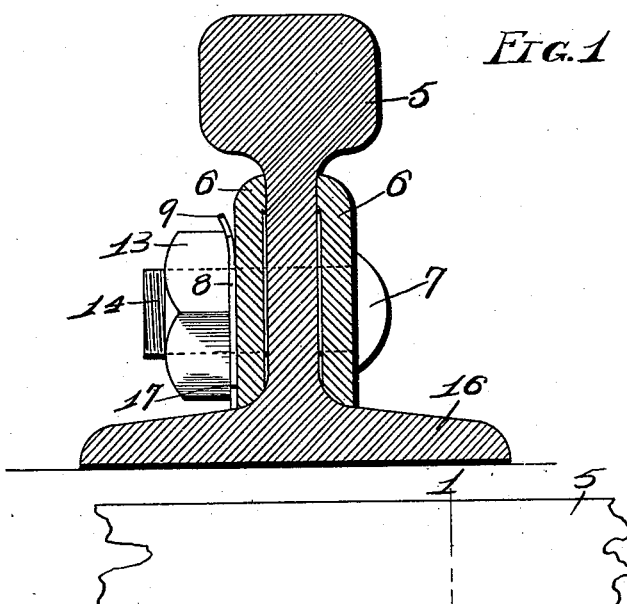
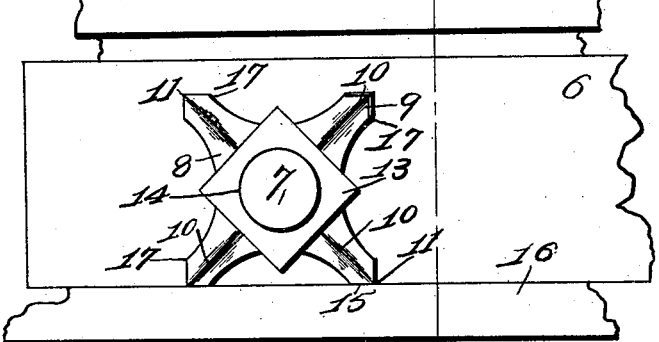
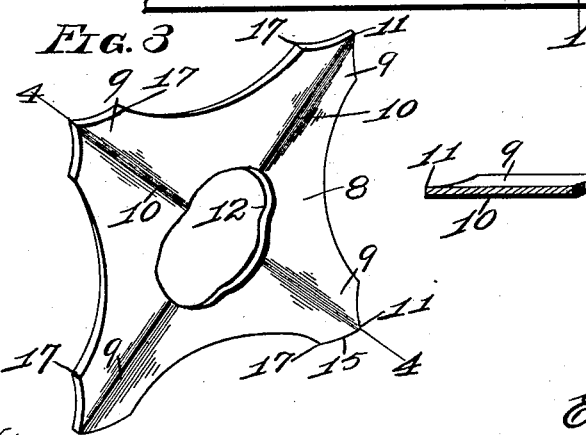
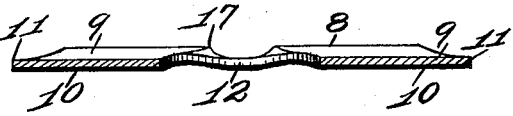
Witnesses
W. C. Stein
L. A. L. McIntyre
Inventor
Edward Dunning
by Hopkins & Eicks Attys.

UNITED STATES PATENT OFFICE.

EDWARD DUNNING, OF TULSA, OKLAHOMA.

NUT-LOCK.

992,486.  Specification of Letters Patent.  Patented May 16, 1911.

Application filed August 5, 1909. Serial No. 511,458.

*To all whom it may concern:*

Be it known that I, EDWARD DUNNING, a citizen of the United States, and resident of Tulsa, Oklahoma, have invented certain new and useful Improvements in Nut-Locks, of which the following is a specification.

This invention relates to improvements in nut locks and has for its object to provide a washer having a plurality of radially projecting arms and so bent and shaped as to hold the nut in a locked position when the same has been properly applied.

In the drawings—Figure 1 is a cross-sectional view of a rail showing my invention in operative position. Fig. 2 is a side view of the same. Fig. 3 is a detail perspective view of the washer. Fig. 4 is a sectional view taken on the line 4—4 of Fig. 3.

Referring to the drawings in detail, 5 indicates an ordinary railway rail, 6 the fish-plates and 7 the bolt. On the bolt 7 and against the fish-plate is placed my improved washer 8 which consists of a plate suitably cut forming a plurality of radially projecting arms or prongs 9, said plate being bent to form ridges or rounded portions 10 on a line from the point 11 of the prongs to the central opening 12 of the plate. The hollow portion of the plate is placed against the fish-plate and the nut 13 which is applied on the threaded end 14 of the bolt is brought in contact with the outer surface of the washer, and when said nut is tightly applied the ridges or rounded portion 10 formed on each prong give sufficiently to permit the corners of the nut to pass; and when the nut is in position as shown in Fig. 2, bringing the corners between the prongs, the nut is tightly bound and prevented from passing over the ridges except when using a wrench. The washer is prevented from turning by means of the flattened portions 15 of the prongs resting against the flange 16 of the rail. I may construct this plate with any number of projecting arms so as to accommodate a hexagonal nut as well as one square.

If it is found necessary, the operator in setting the bolt can by inserting an instrument between one of the prongs and the fish-plate, bend the same outwardly so that the arm will communicate with the side of the nut. This feature of bending is clearly shown in Fig. 1, but ordinarily it is not necessary owing to the formation of the ridge to bend the arms.

Should the washer be brought in contact with a wood surface, the sharpened unturned edges 17 of the washer will embed themselves in the wood and prevent the same from turning.

Having thus fully described my invention, what I claim as new and desire to have secured to me by the grant of Letters Patent, is:

1. A nut lock comprising a body having a central opening in combination with a bolt around which the body is applied, said body being of a size smaller than the diameter of the nut with which it contacts; arms radiating from the body, each having a curved central ridge; the body and arms so arranged as to permit the corners of the nut to project beyond the body and between the arms, in which position the nut is held and tightly locked by the compression of the central ridges of the body, with which the nut contacts, the remaining portion of the ridges on the arms remaining intact, substantially as specified.

2. A nut lock comprising a plate of metal having a central opening in combination with a bolt around which the plate is applied, said plate having a portion of each of its sides cut away forming semi-circular recesses, the remaining portion acting as projecting arms, the body portion of the plate being of a size smaller than the diameter of the nut with which it contacts, the arm portions of the plate radiating from the body portion each having a curved central ridge, the body and arms so arranged as to permit the corners of the nut to project beyond the body over the semi-circular recesses and between the arms in which position a nut is held and tightly locked by the compression of the central ridges of the body portion with which the nut contacts, the remaining portion of the arms permitted to project beyond the contact line of the nut with the plate so as to prevent the nut from passing over the arms, substantially as specified.

In testimony whereof, I have signed my name to this specification, in presence of two subscribing witnesses.

EDWARD DUNNING.

Witnesses:
 ALFRED A. EICKS,
 WALTER C. STEIN.

Copies of this patent may be obtained for five cents each, by addressing the "Commissioner of Patents, Washington, D. C."